(12) United States Patent
Wildman et al.

(10) Patent No.: US 10,759,514 B2
(45) Date of Patent: Sep. 1, 2020

(54) FOLDING WING TIP AND ROTATING LOCKING MEMBER

(71) Applicant: AIRBUS OPERATIONS LIMITED, Bristol (GB)

(72) Inventors: Eric Wildman, Bristol (GB); Matthew Harding, Bristol (GB)

(73) Assignee: Airbus Operations Limited, Bristol (GB)

( * ) Notice: Subject to any disclaimer, the term of this patent is extended or adjusted under 35 U.S.C. 154(b) by 504 days.

(21) Appl. No.: 15/596,711

(22) Filed: May 16, 2017

(65) Prior Publication Data

US 2017/0334543 A1 Nov. 23, 2017

(30) Foreign Application Priority Data

May 20, 2016 (GB) .................................. 1608866.8

(51) Int. Cl.
*B64C 3/56* (2006.01)
*B64C 27/50* (2006.01)

(52) U.S. Cl.
CPC ............... *B64C 3/56* (2013.01); *B64C 27/50* (2013.01)

(58) Field of Classification Search
CPC .......... B64C 3/56; B64C 27/50; B64C 23/072
See application file for complete search history.

(56) References Cited

U.S. PATENT DOCUMENTS

| | | | | |
|---|---|---|---|---|
| 3,343,610 A | * | 9/1967 | Vacca ...................... | B64C 27/50 416/142 |
| 4,039,163 A | * | 8/1977 | Shorey ...................... | B64C 1/22 244/137.1 |
| 4,466,775 A | * | 8/1984 | Martin ..................... | B64C 27/50 416/143 |
| 5,427,329 A | | 6/1995 | Renzelmann et al. | |
| 2007/0075205 A1 | * | 4/2007 | Shin ........................ | B60N 3/106 248/311.2 |
| 2009/0045288 A1 | | 2/2009 | Nakamura et al. | |
| 2012/0228424 A1 | | 9/2012 | Parker | |
| 2015/0298793 A1 | | 10/2015 | Fox et al. | |
| 2017/0276183 A1 | * | 9/2017 | Davies ..................... | B64C 9/24 |

FOREIGN PATENT DOCUMENTS

| | | |
|---|---|---|
| EP | 2730500 | 5/2014 |
| EP | 2899119 | 7/2015 |
| GB | 191422440 | 9/1915 |
| GB | 2530578 | 3/2016 |
| WO | 2011/051699 | 5/2011 |

OTHER PUBLICATIONS

Combined Search and Examination Report for GB1608866.8, dated Nov. 10, 2016, 7 pages.
European Search Report cited in EP 17170809.2 dated Jul. 28, 2017, 9 pages.

* cited by examiner

*Primary Examiner* — Jessica B Wong
(74) *Attorney, Agent, or Firm* — Nixon & Vanderhye P.C.

(57) ABSTRACT

A rotatable locking member for locking an aircraft wing with a movable wing tip device. The rotatable locking member including a U-shaped receiving portion arranged such that in an unlocked position the locking pin may be moved into and out of the U-shaped receiving portion, and in a locked position the locking pin is not able to be moved out of the U-shaped receiving portion, and the rotatable locking member is configured to be moved between the unlocked and locked position by rotational movement around the longitudinal central axis of the locking pin.

18 Claims, 7 Drawing Sheets

FOLDING WING TIP AND ROTATING LOCKING MEMBER

RELATED APPLICATION

This application claims priority to United Kingdom patent application GB 1608866.8 filed May 20, 2016, the entire contents of which is hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

Therefore, folding wing tip devices have been introduced into passenger aircraft, where a wing tip device is movable between a flight configuration for use during flight, and a ground configuration for use during ground-based operations. In the ground configuration, the wing tip device is moved away from the flight configuration such that the span of the aircraft wing is reduced, thereby allowing use of existing gates and safe taxiway usage.

In order to securely fasten the folding wing tip device in the flight configuration, one or more locking mechanisms must be used. However, conventional locking mechanisms may not provide the secure fastening required for a folding wing tip.

The present invention seeks to mitigate the above-mentioned problems. Alternatively or additionally, the present invention seeks to provide an improved wing tip device and locking mechanism.

SUMMARY OF THE INVENTION

The present invention provides, according to a first aspect, an aircraft comprising an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the locking pin being cylindrical and having a longitudinal central axis, the rotatable locking member comprising a U-shaped receiving portion arranged such that in an unlocked position the locking pin may be moved into and out of the U-shaped receiving portion, and in a locked position the locking pin is not able to be moved out of the U-shaped receiving portion, and the rotatable locking member is configured to be moved between the unlocked and locked position by rotational movement around the longitudinal central axis of the locking pin.

Movement of the rotatable locking member from the unlocked to locked position may comprise rotation of 180 degrees.

The rotatable locking member may comprise a toothed outer surface. The toothed outer surface of the rotatable locking member may be associated with a toothed actuator. The actuator may be driven to move the rotatable locking member between the locked and unlocked positions.

The rotatable locking member may be associated with a secondary locking mechanism, the secondary locking mechanism arranged to prevent rotation of the rotatable locking member when the rotatable locking member is in the locked position.

The rotatable locking member may be located within a lock housing. The lock housing may be fixed relative to the wing or wing tip device and arranged to allow rotational movement of the rotating locking member within the housing. The housing may comprise a landing, the landing arranged to contact the locking pin when the rotatable locking member is in the locked position. The landing may act to reduce or prevent the locking pin hogging or bending under load. The rotatable locking member may comprise a slot associated with the landing, such that the rotatable locking member may extend to either side of the landing whilst still allowing for the rotational movement of the rotatable locking member. Increasing the number of contact points with the locking pin when the rotatable locking member is in the locked position may further increase the strength of the locking arrangement.

The rotatable locking member may be associated with the fixed wing. Such an arrangement may be advantageous as the moving parts and driving arrangement of the locking member may be provided in a fixed location. In such an arrangement, the locking pin may be associated with the wing tip device.

Alternatively, the rotatable locking member may be associated with the wing tip device and the locking pin may be associated with the fixed wing.

The aircraft wing may comprise a plurality of rotatable locking members and associated locking pins. For example, the aircraft wing may comprise two, three, four, or five rotatable locking members and associated locking pins. The aircraft wing may comprise a common drive source for actuating each of the rotatable locking members.

The wing tip device may be a wing tip extension; for example the wing tip device may be a planar tip extension. In other embodiments, the wing tip device may comprise, or consist of, a non-planar device, such as a winglet. In the flight configuration the trailing edge of the wing tip device is preferably a continuation of the trailing edge of a fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing.

When the wing tip device is in the ground configuration, the aircraft may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a second aspect of the invention there is also provided a method of locking a wing tip device in a locked flight configuration on an aircraft according to the first aspect of the invention, the method comprising the steps of: moving the wing tip device into the flight configuration and rotating the rotatable locking member around the central longitudinal axis of the locking pin, such that the rotatable locking member moves into the locked configuration.

According to a third aspect of the invention, there is provided a method of unlocking a wing tip device from a locked flight configuration on an aircraft according to the first aspect of the invention, the method comprising the steps of: rotating the rotatable locking member around the central longitudinal axis of the locking pin, such that the rotatable locking member moves into the unlocked configuration.

According to a fourth aspect, there is provided an aircraft wing, the aircraft wing comprising a fixed wing and a wing tip device at the tip thereof, wherein the wing tip device is configurable between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the folding wing tip device in the locked flight configuration, the locking mechanism comprising a rotatable locking member associated with one of the folding wing tip device and the fixed wing, and a locking pin associated with the other of the folding wing tip device and the fixed wing, the locking pin being cylindrical and having a longitudinal central axis, the rotatable locking member comprising a U-shaped receiving portion arranged such that in an unlocked position the locking pin may be moved into and out of the U-shaped receiving portion, and in a locked position the locking pin is not able to be moved out of the U-shaped receiving portion, and the rotatable locking member is configured to be moved between the unlocked and locked position by rotational movement around the longitudinal central axis of the locking pin.

According to a fifth aspect of the invention, there is provided a locking mechanism for locking a folding wing tip device in a locked flight configuration on a fixed wing, the locking mechanism comprising a rotatable locking member which may be associated with one of the folding wing tip device and the fixed wing, and a locking pin which may be associated with the other of the folding wing tip device and the fixed wing, the locking pin being cylindrical and having a longitudinal central axis, the rotatable locking member comprising a U-shaped receiving portion arranged such that in an unlocked position the locking pin may be moved into and out of the U-shaped receiving portion, and in a locked position the locking pin is not able to be moved out of the U-shaped receiving portion, and the rotatable locking member is configured to be moved between the unlocked and locked position by rotational movement around the longitudinal central axis of the locking pin.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
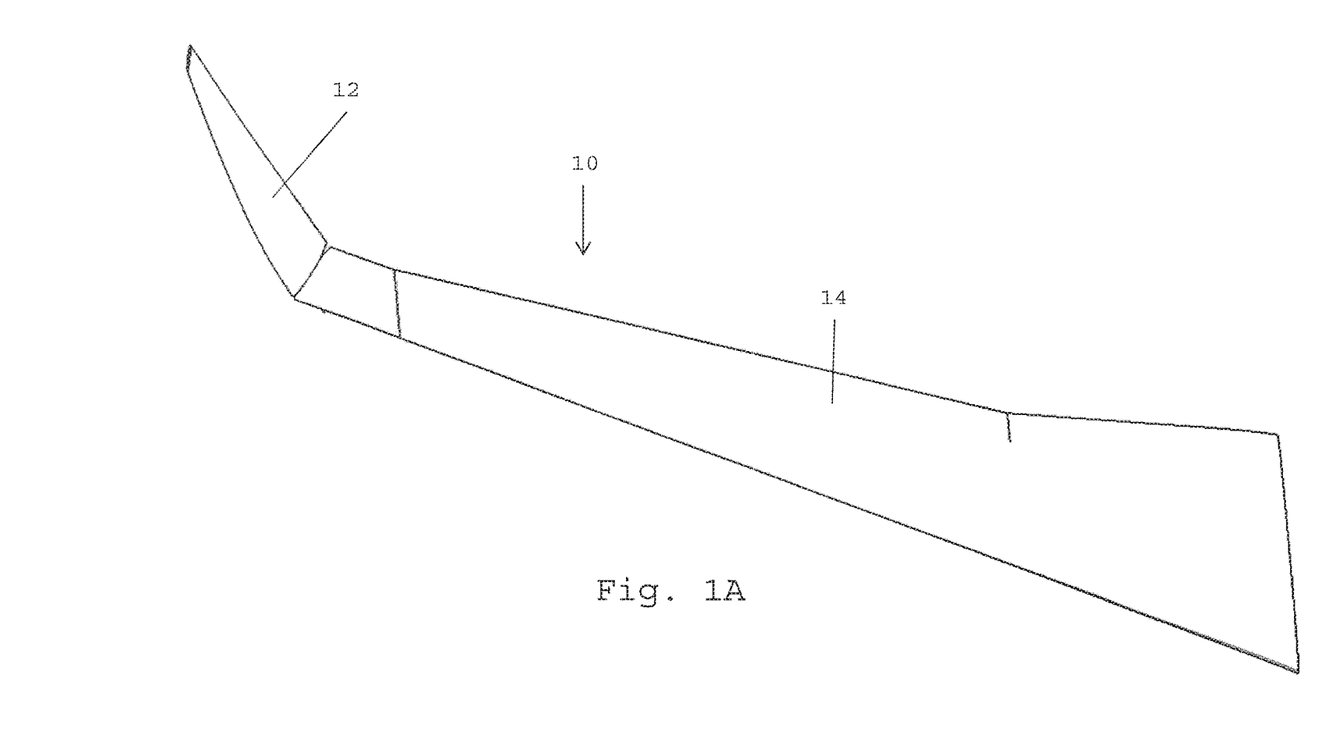
FIG. 1A shows a schematic view of an aircraft wing according to a first embodiment of the invention.
Figure 1B:
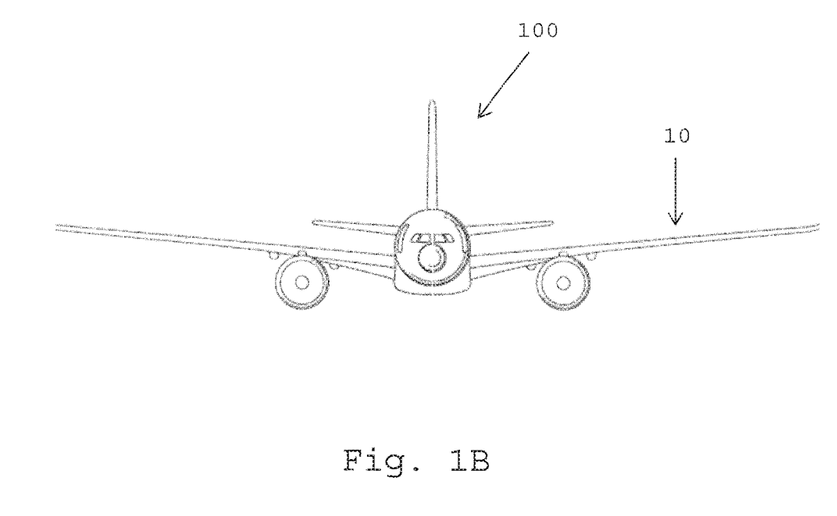
FIG. 1B shows a schematic view of an aircraft according to a second embodiment of the invention.

FIG. 1A shows a wing 10 comprising a wing tip device 12 and a fixed wing 14. FIG. 1B shows an aircraft 100 comprising the wing 10. The wing tip device 12 is configurable between: (i) a locked flight configuration for use during flight, as shown in FIG. 1B and (ii) a ground configuration for use during ground-based operations, as shown in FIG. 1A, in which ground configuration the wing tip device 12 is moved away from the locked flight configuration such that the span of the aircraft wing 10 is reduced.

Figure 2:
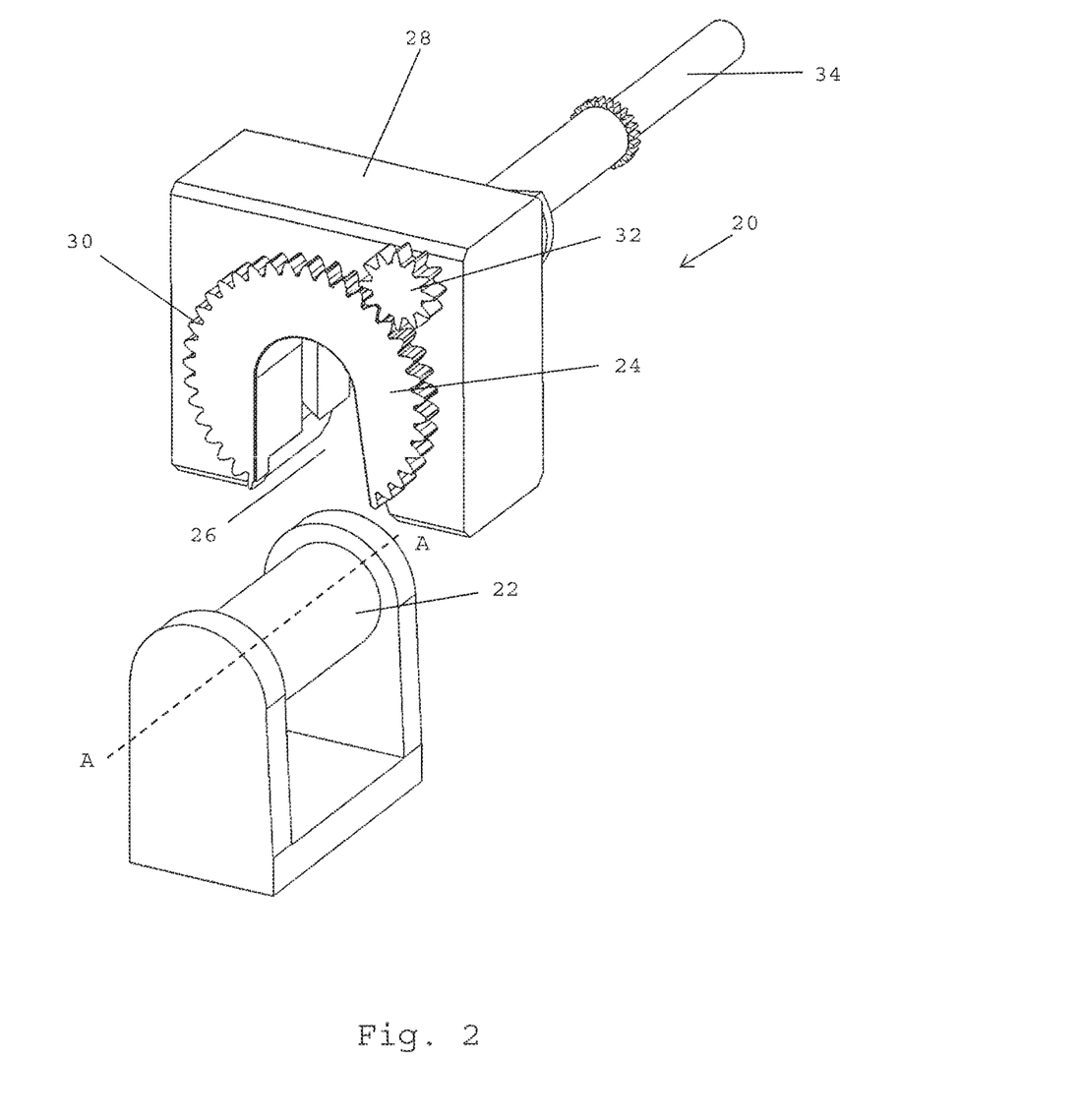
FIGS. 2 to 7 show a locking mechanism according to a third embodiment of the invention.

FIG. 2 shows a locking mechanism 20 comprising a locking pin 22 and a rotatable locking member 24. The locking pin 22 may be associated with a wing tip device 12, and the locking mechanism 20 associated with the wing 10, or vice versa. The locking pin 22 comprises a cylinder with a central longitudinal axis A. The rotatable locking member 24 comprises a U-shaped receiving portion 26, which is shaped to receive the locking pin 22. The receiving portion 26 has a wide mouth to allow easy location of the locking pin 22. As can be seen, the width of the U-shaped receiving portion 26 tapers away from the mouth of the receiving portion 26. This allows easy seating of the locking pin 22 within the receiving portion 26 whilst allowing the locking pin to be securely held in the locked position. The rotatable locking member 24 is rotatably mounted within a housing 28. The rotatable locking member 24 includes a toothed outer edge 30 which is engaged with the toothed drive wheel 32 of a drive shaft 34, the drive shaft connected to and driven by an actuator. The drive shaft 34 may be driven such that the toothed drive wheel 32 causes the rotatable locking member 24 to rotate within the housing 28.

Figure 3:
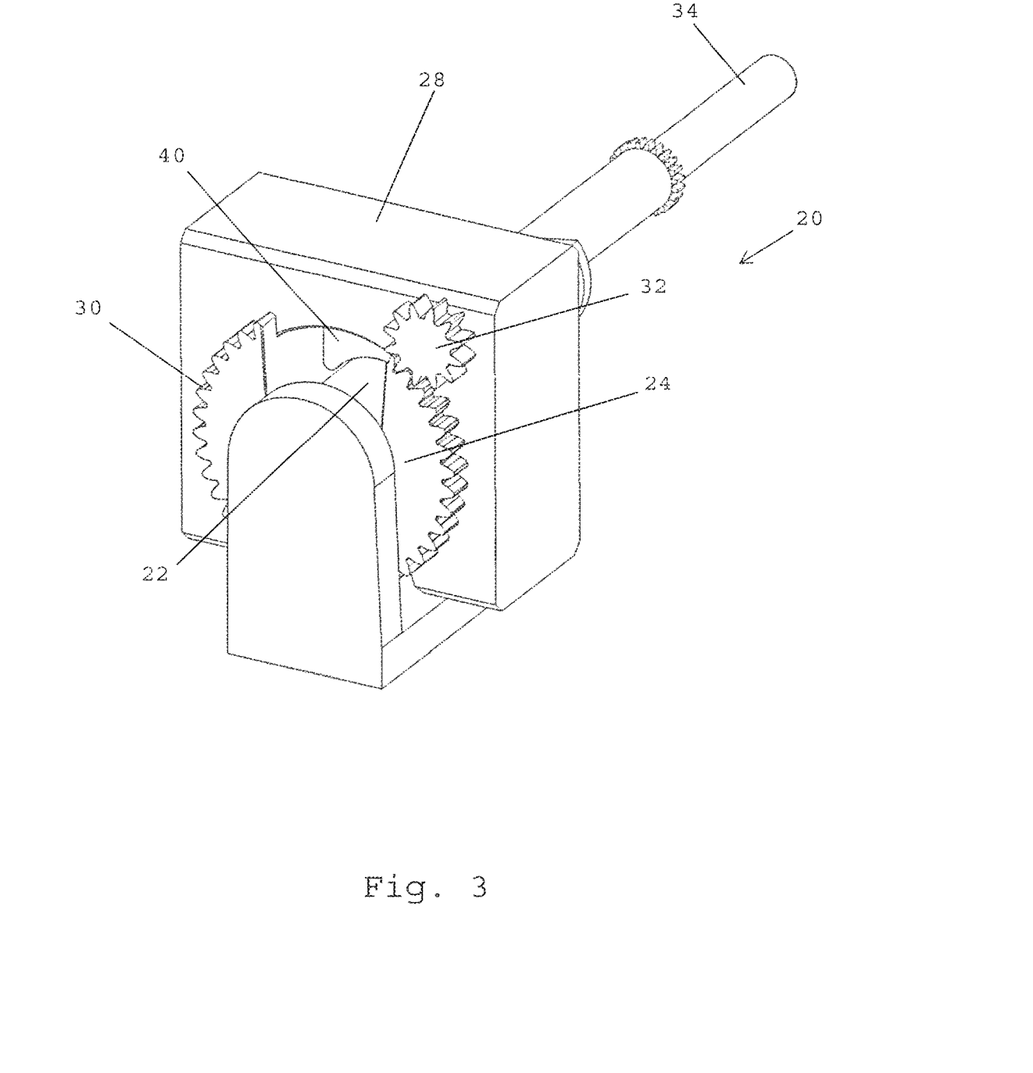

FIG. 2 shows the locking mechanism 20 prior to movement of the locking pin 22 into the receiving section 26. When the wing tip device is moved into the flight configuration, the locking pin 22 will move into the receiving portion 26. The locking mechanism 20 is in the unlocked configuration, meaning that the locking pin 22 can move into and out of the receiving portion 26. To move the locking mechanism 20 into the locked configuration, and thus the wing 10 into the locked flight configuration, the drive shaft 34 is used, via the drive wheel 32 and the toothed outer surface 30, to rotate the rotatable locking member 24 around the axis A. FIG. 3 shows the locking mechanism 20 in the locked configuration, where the rotatable locking member 24 has been rotated approximately 180 degrees around the axis A, and the locking pin 22 is no longer able to move out of the receiving portion 26. In order to unlock the locking mechanism, the drive shaft 34 is used to drive the rotatable locking member 24 in the opposite direction, such that the locking pin 22 may be removed from the receiving portion 26.

Figure 4:
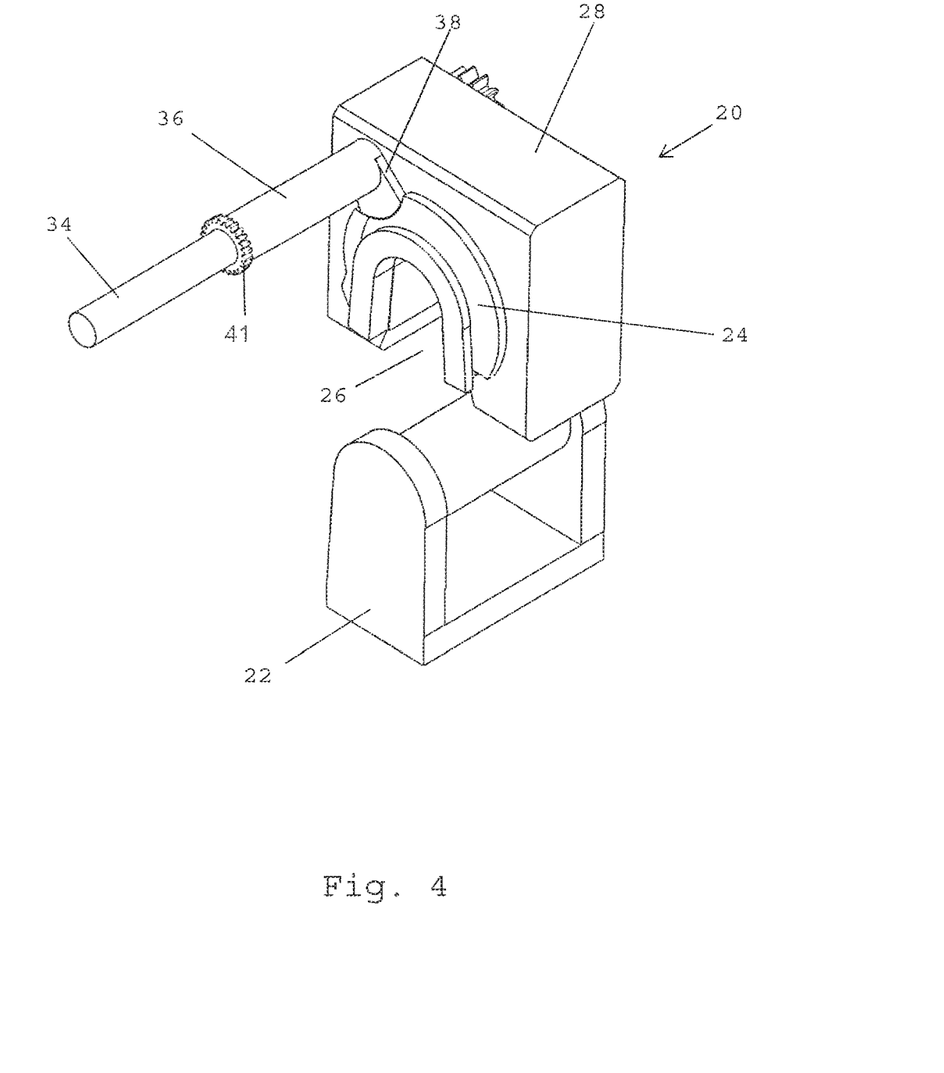

FIG. 4 shows the reverse side of the locking mechanism 20 in a similar position to that shown in FIG. 2. The drive shaft 34 includes a secondary locking mechanism 36. The secondary locking mechanism 36 may be used to prevent the rotational movement of the rotatable locking member 24. In particular, a catch 38 may be rotated into engagement with a portion of the rotatable locking member 24 to prevent rotational movement of the rotatable locking member 24. The secondary locking mechanism may be driven by the toothed wheel 41 and a separate actuator (not shown). Whilst coaxial with the drive shaft 34, the secondary locking mechanism 36 is independently operated.

Figure 5:
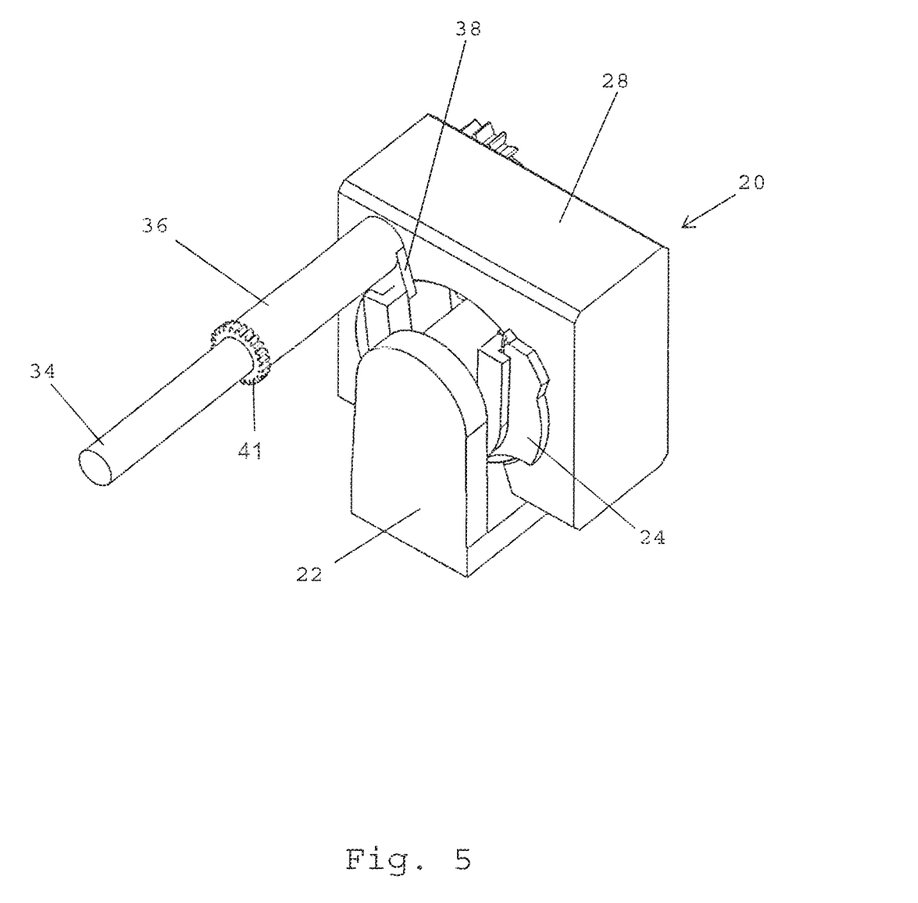

FIG. 5 shows the secondary locking mechanism 36 locking the rotatable locking mechanism 24 in the locked position, corresponding to that shown in FIG. 3. As can be seen, the catch 38 prevents the rotatable locking member 24 being rotated into the unlocked configuration. Therefore, the security of the locking mechanism 20 is increased.

Figure 6:
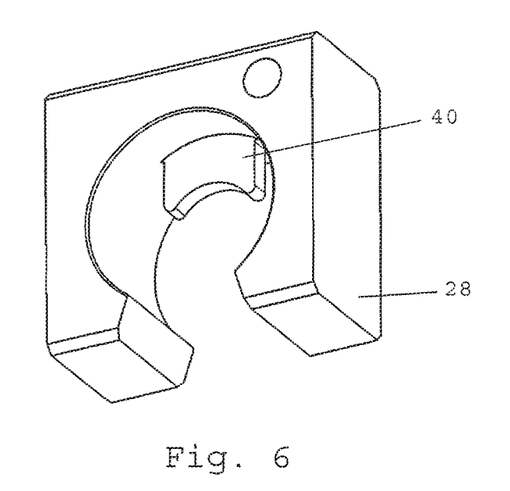

FIG. 6 shows the housing 28 with a landing 40. The landing 40 is located such that the landing 40 contacts the locking pin 22 when the locking pin 22 is brought into the receiving portion 26. When the rotatable locking member 24 has been rotated into the locked configuration, the landing 40 acts to support the locking pin 22, and work against the locking pin 22 hogging, or bending, under load. In order to allow the landing 40 to be located in the approximate centre of the housing 28, the rotatable locking member 26 includes a slot which receives the landing 40, thereby allowing rotational movement of the rotatable locking member 24 as required.

Figure 7:
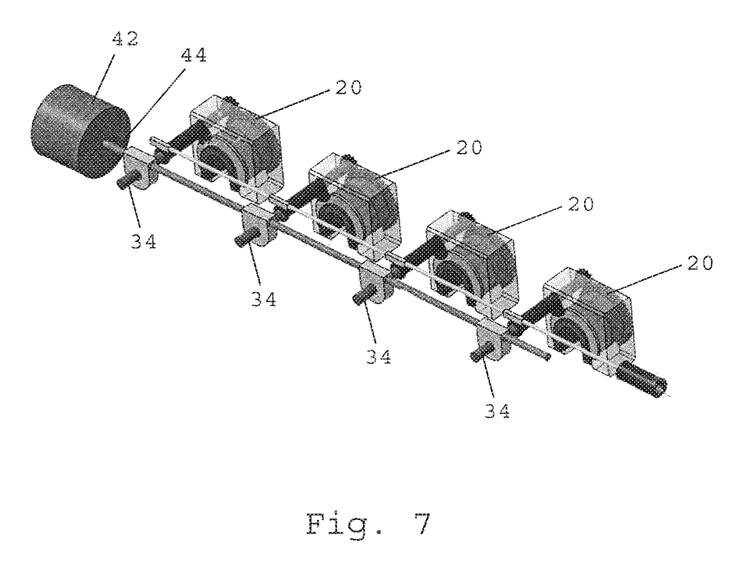

FIG. 7 shows a possible arrangement of a plurality of locking members 20. Four locking members 20 are provided (corresponding locking pins not shown), and each drive shaft 34 is driven by a common actuator 42, via an actuator drive shaft 44. Such an arrangement allows a simple locking mechanism to be used, with reduced complexity compared to each locking member 20 having an individual drive system.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The locking mechanism may be applied to alternative aircraft components, for example, cargo doors.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft including an aircraft wing, the aircraft wing comprising:
   a fixed wing and a wing tip device at the tip thereof,
   wherein the wing tip device is configurable to move between: (i) a locked flight configuration for use during flight and (ii) a ground configuration for use during ground-based operations, in which ground configuration the wing tip device is moved away from the locked flight configuration such that the span of the aircraft wing is reduced,
   the aircraft wing further comprising:
   a locking mechanism configured to lock the wing tip device in the locked flight configuration, the locking mechanism comprising a rotatable locking member associated with one of the wing tip device and the fixed wing, and a locking pin associated with the other of the wing tip device and the fixed wing, the locking pin being cylindrical and having a longitudinal central axis, the rotatable locking member comprising a U-shaped receiving portion having an open end which is open through a side of the rotatable locking member, and the U-shaped receiving portion is arranged such that in an unlocked position the locking pin may be moved into and out of the open end of the U-shaped receiving portion, and in a locked position the locking pin is seated within the U-shaped receiving portion and not able to be moved out of the U-shaped receiving portion, and
   the rotatable locking member is configured to be moved between the unlocked and locked position by rotational movement around the longitudinal central axis of the locking pin, wherein the rotatable locking member comprises a toothed outer surface, and the toothed outer surface of the rotatable locking member is associated with a toothed actuator, the toothed actuator being arranged to move the rotatable locking member between the locked and unlocked positions.

2. The aircraft according to claim 1 wherein movement of the rotatable locking member from the unlocked to locked position comprises rotation of 180 degrees.

3. The aircraft according to claim 1 wherein the rotatable locking member is associated with a secondary locking mechanism, the secondary locking mechanism arranged to prevent rotation of the rotatable locking member when the rotatable locking member is in the locked position.

4. The aircraft according to claim 1, wherein the rotatable locking member is located, at least partially, within a lock housing.

5. The aircraft according to claim 4 wherein the lock housing is arranged to allow rotational movement of the rotating locking member.

6. The aircraft according to claim 4, wherein the housing comprises a landing, the landing is arranged to contact the locking pin when the rotatable locking member is in the locked position.

7. The aircraft according to claim 6 wherein a slot in the rotatable locking member is associated with the landing.

8. The aircraft according to claim 1, wherein the rotatable locking member is associated with the fixed wing.

9. The aircraft according to claim 1, wherein the locking pin is associated with the wing tip device.

10. The aircraft according to claim 1, wherein the aircraft wing comprises a plurality of ones of the rotatable locking member and associated ones of the locking pin.

11. The aircraft according to claim 10, wherein the aircraft wing comprises a common drive source configured to actuate each of the rotatable locking members.

12. The aircraft according to claim 1, further comprising a bracket including a first arm attached to a first end of the locking pin and a second arm attached to a second end of the locking pin.

13. The aircraft of claim 1, wherein the U-shaped receiving portion includes a closed end opposite to the open end of the U-shaped receiving portion along a direction perpendicular to the central axis of the locking pin.

14. A method of unlocking a wing tip device from a locked flight configuration on an aircraft according to claim 1, the method comprising rotating the rotatable locking member around the central longitudinal axis of the locking pin, such that the rotatable locking member moves into the unlocked configuration.

15. An aircraft wing comprising a fixed wing and a wing tip device at the tip thereof, wherein the wing tip device is configurable to move between: (i) a locked flight configuration for use during flight and (ii) a ground configuration for use during ground-based operations, in which ground configuration the wing tip device is moved away from the locked flight configuration such that the span of the aircraft wing is reduced, the aircraft wing further comprising a locking mechanism for locking the wing tip device in the locked flight configuration, the locking mechanism comprising:

a rotatable locking member associated with one of the wing tip device and the fixed wing, and a locking pin associated with the other of the wing tip device and the fixed wing, the locking pin being cylindrical and having a longitudinal central axis, the rotatable locking member comprising a U-shaped receiving portion including an open end that is open through a side of the rotatable locking member, wherein the rotatable locking member is arranged such that in an unlocked position the locking pin may be moved into and out of the open end of the U-shaped receiving portion, and in a locked position the locking pin is seated in the U-shaped receiving portion and not able to be moved out of the U-shaped receiving portion, and the rotatable locking member is configured to be moved between the unlocked and locked position by rotational movement around the longitudinal central axis of the locking pin, wherein the rotatable locking member comprises a toothed outer surface, and the toothed outer surface of the rotatable locking member is associated with a toothed actuator, the toothed actuator being arranged to move the rotatable locking member between the locked and unlocked positions.

16. The aircraft wing to claim 15, further comprising a bracket including a first arm attached to a first end of the locking pin and a second arm attached to a second end of the locking pin.

17. The aircraft wing of claim 15, wherein the U-shaped receiving portion includes a closed end opposite to the open end of the U-shaped receiving portion along a direction perpendicular to the longitudinal central axis of the locking pin.

18. A method of locking a wing tip device in a locked flight configuration on an aircraft according to claim 15, the method comprising the steps of: moving the wing tip device into the flight configuration and rotating the rotatable locking member around the central longitudinal axis of the locking pin, such that the rotatable locking member moves into the locked configuration.

\* \* \* \* \*